US010752510B2

(12) United States Patent
Drexel et al.

(10) Patent No.: US 10,752,510 B2
(45) Date of Patent: Aug. 25, 2020

(54) COARSE SUPPORT SILICA PARTICLES (75) Inventors: Claus-Peter Drexel, Neu-Isenburg (DE); Frank Haselhuhn, Hanau (DE); Frank Heindl, Rodenbach (DE); Ralf Rausch, Moembris (DE); Guenter Stein, Nidderau (DE)

(73) Assignee: EVONIK OPERATIONS GMBH, Essen (DE)

( * ) Notice: Subject to any disclaimer, the term of this patent is extended or adjusted under 35 U.S.C. 154(b) by 456 days.

(21) Appl. No.: 13/582,177

(22) PCT Filed: Mar. 14, 2011

(86) PCT No.: PCT/EP2011/053798
§ 371 (c)(1),
(2), (4) Date: Aug. 31, 2012

(87) PCT Pub. No.: WO2011/117100
PCT Pub. Date: Sep. 29, 2011

(65) Prior Publication Data
US 2012/0322893 A1 Dec. 20, 2012

(30) Foreign Application Priority Data
Mar. 24, 2010 (DE) .................. 10 2010 003 204

(51) Int. Cl.
| | | |
|---|---|---|
| *C01B 33/12* | (2006.01) |
| *A61K 47/04* | (2006.01) |
| *A61K 8/25* | (2006.01) |
| *C11D 3/12* | (2006.01) |
| *A61Q 13/00* | (2006.01) |
| *C09B 69/00* | (2006.01) |
| *C09K 3/00* | (2006.01) |
| *A01N 25/00* | (2006.01) |
| *A01P 3/00* | (2006.01) |
| *A01P 1/00* | (2006.01) |
| *C08K 3/36* | (2006.01) |
| *C04B 14/04* | (2006.01) |
| *C12P 1/00* | (2006.01) |
| *B01J 21/08* | (2006.01) |
| *C01B 33/18* | (2006.01) |
| *B01J 20/28* | (2006.01) |
| *C09C 1/30* | (2006.01) |
| *B01J 20/10* | (2006.01) |

(52) U.S. Cl.
CPC .......... *C01B 33/18* (2013.01); *B01J 20/103* (2013.01); *B01J 20/28004* (2013.01); *B01J 20/28057* (2013.01); *B01J 20/28069* (2013.01); *C09C 1/30* (2013.01); *B01J 21/08* (2013.01); *C01P 2004/61* (2013.01); *C01P 2004/62* (2013.01); *C01P 2006/12* (2013.01); *C01P 2006/14* (2013.01); *C01P 2006/19* (2013.01); *Y10T 428/2982* (2015.01)

(58) Field of Classification Search
None
See application file for complete search history.

(56) References Cited

U.S. PATENT DOCUMENTS

| | | | | |
|---|---|---|---|---|
| 5,776,240 | A | * | 7/1998 | Deller et al. .................. 106/482 |
| 7,153,521 | B2 | | 12/2006 | Viot |
| 7,731,790 | B2 | | 6/2010 | Viot |
| 8,129,314 | B2 | | 3/2012 | Heindl et al. |
| 2003/0044442 | A1 | | 3/2003 | Stanier et al. |
| 2009/0050557 | A1 | * | 2/2009 | Bouchara et al. ......... 210/500.1 |
| 2010/0151038 | A1 | * | 6/2010 | Cabelka et al. ............. 424/499 |
| 2011/0136919 | A1 | | 6/2011 | Heindl et al. |

FOREIGN PATENT DOCUMENTS

| | | |
|---|---|---|
| CN | 1042132 A | 5/1990 |
| CN | 1134399 A | 10/1996 |
| CN | 1233586 A | 11/1999 |
| CN | 1472138 A | 2/2004 |
| DE | 10 2006 002 765 A1 | 7/2007 |
| DE | 10 2008 035 867 A1 | 2/2010 |
| EP | 0 725 037 A1 | 8/1996 |
| EP | 0 937 755 A1 | 8/1999 |
| EP | 0 966 207 B1 | 7/2004 |
| EP | 0 984 772 B1 | 8/2004 |
| WO | 01/64168 A2 | 9/2001 |
| WO | 2007036620 A1 | 4/2007 |

OTHER PUBLICATIONS

International Search Report for PCT/EP2011/053798 dated Jul. 14, 2011.
PCT Notification Concerning Transmittal of International Preliminary Report on Patentability(Form PCT/IB/326) dated Oct. 4, 2012 for Application No. PCT/EP2011/053798.
PCT Notification of Transmittal of Translation of the International Preliminary Examination Report (Form PCT/IB/338) dated Oct. 4, 2012 for Application No. PCT/EP2011/053798.
PCT International Preliminary Report on Patentability (Form PCT/IB/373) dated Sep. 25, 2012 for Application No. PCT/EP2011/053798.
PCT Written Opinion of the International Searching Authority (Form/ISA/237) with English translation dated Sep. 24, 2012 for Application No. PCT/EP2011/053798.
English translation of a Chinese Office Action for family member CN Application No. 201180015532.7.

\* cited by examiner

*Primary Examiner* — Dominic Lazaro
(74) *Attorney, Agent, or Firm* — Smith, Gambrell & Russell, LLP (57) ABSTRACT The present invention relates to novel granular silicas for use as support material, especially as support for catalysts for fixed bed reactors, and to the production and use thereof.

23 Claims, 2 Drawing Sheets

COARSE SUPPORT SILICA PARTICLES

The present invention relates to novel granular silicas for use as a carrier material, especially as a support for catalysts in different reactor systems, and to the production and use thereof.

In many fields of application, for example in the sector of products for crop protection, in the case of active pharmaceutical ingredients, in the production of animal feeds and animal feed additives or in the foods industry, carrier materials are used to convert, for example, liquid or resinous active ingredients to a free-flowing and storage-stable form. To produce the solid formulations, liquid or meltable substances or substance mixtures are applied to carrier materials, in some cases together with assistants (for example surfactants and disintegrants). In the case of solid substances the carrier materials serve primarily as a filler, whereas they absorb liquid in the case of liquid or low-melting substances. This should afford easy-to-handle, outwardly dry absorbates, which are then brought to market, in the agrochemical sector for example, directly in the form of powder (known as WP, wettable powder) or, in further-processed form, as granules/extrudates (WG, water dispersible granules). If required by the particular applications, the absorbed solutions can be dried, or the absorbed melts can be solidified. In general, reference is made to laden carrier materials.

A significant demand on the carrier material is a sufficiently high absorptivity, such that as little as possible carrier material need be used. A series of patent applications, for example DE102006002765, is therefore concerned with processes for enhancing the content of absorbed material on the carrier material. However, the performance of these processes is very complex and they have not become established on the industrial scale to date.

A further demand on the carrier material is that the absorbates have good free flow and hence good processibility. In addition, the silicas should have a minimum level of dusting in the course of transport, dispensing and production of the absorbates. To improve the free flow, EP 0984772 B1 and EP 0966207 B1, for example, therefore proposed using microgranular silicas with approximately spherical shape and with a Mean particle size of more than 150 µm as carrier material. Although the absorbates obtained in this way have improved free flow, the processing properties of the silicas are not optimal, since caking in the mixers has frequently been observed in the production of absorbates with these silicas, and has to be removed, sometimes in a costly and inconvenient manner.

In the field of fixed bed catalysis, there are further additional demands on the carrier or support material. For example, it is necessary to ensure that reactions in fixed bed reactors in which the reactants flow through a reaction chamber filled with laden support materials to which a catalyst has been applied give rise to minimum pressure drops in the reaction chamber. In the case of reactions in which a catalyst-laden support material is suspended in a reaction medium, the support material has to be removable again readily at the end of the reaction. Finally, reactions in a fluidized bed reactor require that the laden support materials can be fluidized efficiently therein. It is thus obvious that different reactor types place quite different demands on the laden supports and hence also on the support material. To date, research work has substantially been focussed, as shown above, on the absorptivity of carrier materials or the processibility thereof. There are still no satisfactory support materials for the specific demands in catalytic processes.

There is therefore still a high demand for inexpensive carrier or support materials which have good processibility, allow production of highly laden absorbates with good free flow, and additionally have good suitability for catalytic processes.

Absorbates are understood to mean carrier or support silicas laden with an active substance or an active substance mixture, directly or in dispersion, solution or in the melt. In addition to the active substance or active substance mixture, it is also possible to load assistants or excipients. The substances loaded onto the carrier or support silica are also referred to here as absorbed substances.

It was therefore an object of the present invention to provide novel granular silicas which have at least some of the disadvantages of the prior art carrier or support materials only to a reduced degree, if at all, and which allow production of novel laden carriers or supports with improved performance properties. In addition, a process for producing these granular silicas and for producing the laden carriers or supports shall be provided.

It was a specific object of the invention to provide granular silicas which allow production of supports which have been laden with catalysts and which can be removed very readily from suspensions.

It was a further specific object of the invention to provide granular silicas which allow production of supports which have been laden with catalysts and which, in fixed bed reactors, cause a minimum level of pressure drop of the reaction mixture as it flows through.

These objects and further objects which are not stated explicitly are achieved by the granular silicas, laden carriers or supports and production processes defined in detail in the claims, description and examples.

It has been found that, surprisingly, it is not sufficient to use support materials of spherical shape and mean particle size more than 150 µm, as described in EP 0984772 B1 and EP 0966207 B1 to produce absorbates, since such support materials have not achieved satisfactory results in fixed bed reactions.

The inventors have found, by in-depth studies, that an essential criterion that the support material has to meet is the stability thereof to mechanical stresses. When the support material is too soft, stress on the support material in the mixer can result in caking. In addition, in the course of further processing of the laden support materials and during the filling of the reactors, a portion of the support materials may be pulverized, and the powder formed may block the reactor, resulting in an increased pressure drop in the reactor.

It is also known that abrasion phenomena can occur as a fluid flows over the laden supports in the reactor if the support materials are not sufficiently hard; this can obviously explain pressure drops in the running operation of fixed bed reactors or filtration problems in the region of the suspended catalysts.

Finally, it has been found that the particles of the support materials must have a specific particle size distribution in order to cause a minimum flow resistance in the fixed bed reactor or in the fluidized bed reactor.

It was possible by a specific production process to enhance the hardness of the inventive granular silicas such that they significantly better withstand the mechanical stress in the absorbate production, the absorbate processing and the operation of reactors, and thus have significantly improved performance properties. In addition, the particle size distribution was improved, and it was ensured that the hardened granular silicas have a sufficiently high porosity. The inventive granular silicas are therefore notable for a sufficiently high porosity—expressed by the Hg pore volume—better-stabilized pore walls—expressed by the ratio of the mean particle size ($d_{50}$) without ultrasound exposure to the mean particle size ($d_{50U}$) after 3 min of ultrasound exposure—and an optimized particle size—expressed by the $d_{Q3=10\%}$ for description of the fine fraction and by the $d_{Q3=90\%}$ for description of the coarse fraction. In other words, the increase in the mechanical stability was achieved and, at the same time, a high absorptivity with optimal particle size distribution was obtained.

In a preferred embodiment, the inventive silicas have an approximately neutral pH, such that they can be used very universally as carriers or supports and do not have any adverse effects on the storage stability of the absorbed materials.

In addition, the inventive silicas, compared to commercially used carrier or support silicas, for example Zeosil 165 GR from Rhodia Chimie or Zeodent DP-9175 from Huber Corp. have an optimal ratio of hardness, i.e. mechanical stability, particle size distribution with regard to fine and coarse fractions, and absorptivity.

The present invention therefore provides granular silicas having
   an Hg pore volume (<4 µm) of more than 0.90 ml/g,
   a $d_{Q3=10\%}$ of more than 400 µm with, at the same time, a $d_{Q3=90\%}$ of less than 3000 µm, and
   a ratio of the $d_{50}$ without ultrasound exposure to $d_{50}$ after 3 min of ultrasound exposure of <4.00. This measurement is effected on a fraction of particles from 400 to 500 µm.

The present invention further provides granular silicas which, in addition to the abovementioned parameters, have at least one of the following properties:
   pH of 5 to 8.5
   a ratio of the $d_{50}$ without ultrasound exposure to $d_{50}$ after 3 min of ultrasound exposure of 1.00 to 3.00, preferably 1.00 to 2.60, more preferably 1.00 to 2.10, especially preferably 1.00 to 1.60. This measurement is effected on a fraction, of particles from 400 to 500 µm.

The present invention additionally provides a first process for producing the inventive granular silicas, comprising the steps of
   a) providing a precipitated or fumed silica, in dried and/or ground form, having
      a mean particle size $d_{50}$ without ultrasound treatment of 0.1 to 350 µm,
      a BET surface area of 30 to 800 m²/g, and
      a DBP number of 140 to 400 g/100 g;
   b) moistening the silica from step a) according to the shaping process employed to a drying loss of 30-80% by weight;
   c) shaping the silica from step b) by extrusion, granulation, compaction, or other customary shaping processes;
   d) drying the shaped silica bodies in drying units suitable therefor; and
   e) screen granulation or screening of the granules at a screen size of 3000 µm and screening off the fines with a screen mesh size of 400 µm.

Alternatively to the above-described first process according to the invention, it is also possible to use a water-containing filtercake with a drying loss of 30-80% by weight is used as the starting material for step c).

The present invention further provides a second process for producing the inventive granular silicas, comprising the steps of
   i) providing a precipitated or fumed silica, in dried and/or ground form, having a drying loss of <30% by weight, and having
      a mean particle size $d_{50}$ without ultrasound treatment of 0.1 to 350 µm,
      a BET surface area of 30 to 800 m²/g, and
      a DBP number of 140 to 400 g/100 g;
   ii) shaping the silica from step i) by dry compaction, preferably between two rotating rollers, at a specific contact pressure of 0.5 kN/cm of roller width to 12 kN/cm of roller width to give slugs, and
   iii) screen granulation or screening of the slugs at a screen size of 3000 µm and screening off the fines with a screen mesh size of 400 µm.

In all processes according to the invention described above, it is possible to further enhance the hardness of the particles by subjecting them to a treatment with water vapour at elevated temperature, for example 70° C. to 400° C. Thereafter, a further drying step may be necessary.

In addition, it is possible to enhance the hardness of the particles by contacting them with an alkaline substance for a certain time in order to raise the pH of the particles. The process is described in more detail in DE 102008035867 A1.

A further means of enhancing the hardness of the particles consists in calcining the particles at an elevated temperature, typically between 700° C. and 1200° C., for a certain time (generally <1 h).

The above-described process steps for hardening the particles can be performed before or after the process step of screen granulation and screening.

The moistening and/or granulation process steps from the first process according to the invention can be performed in a high-speed intensive mixer, kneader, compactor, pan granulator and/or perforated die press or the like. Alternatively, the moistening may be followed by an extrusion, or a water-containing filtercake can be extruded directly. Extruded shaped bodies can subsequently be altered in geometric shape by further suitable processes (e.g. spheronizer from Caleva).

The drying process steps from the first process according to the invention can be performed, for example, in drying cabinets, fluidized bed dryers, belt dryers or the like. If necessary, the dried shaped bodies can subsequently be adjusted to the appropriate particle size fraction by further processes, for example screening or screen granulation at a screen size of 3000 µm, and screening off the fines fraction with a screen mesh size of 400 µm.

The shaping step from the second process according to the invention is preferably performed in a compactor, for example in an apparatus from Hosokawa Bepex GmbH, such as Bepex L200/50, or Alexanderwerk AG.

The screen granulation from both processes according to the invention is preferably performed in apparatuses such as a screen mill from Frewitt or Hosokawa Bepex GmbH. The screening can be effected by means of all known techniques, preferably by means of a vibrating screen from companies such as Vibra, Engelsmann or Allgeier. It is possible to perform several screens or several screening steps.

The present invention further provides for the use of the inventive silicas as carrier material, preferably as support material for catalysts.

The present invention finally provides absorbates comprising at least one inventive silica.

The subject-matter of the present invention is described in detail hereinafter. In the context of the present invention, the terms "silica(s)", "precipitated silica(s)" and "fumed silica(s)" are used synonymously.

A sufficiently high porosity ensures that the inventive granular silicas have a sufficient pore volume in the meso- and/or macropore range, and hence that the catalyst has good accessibility for the reactants and, at the same time, a minimum amount of support material is required for production of the inventive absorbates. The inventive granular silicas therefore have an Hg pore volume (<4 μm) of more than 0.90 ml/g, preferably of more than 1.35 ml/g, more preferably more than 1.60, even more preferably more than 1.80, especially preferably more than 1.90.

Further preferred inventive granular silicas have an Hg pore volume (<4 μm) of 0.9 to 1.34 ml/g, more preferably of 0.9 ml/g to 1.30 ml/g, most preferably of 0.9 ml/g to 1.20 ml/g.

A further important property of the inventive granular silicas is the hardness thereof. When the porosity is high, it may be the case that the mechanical stability can no longer be ensured, which can result in increased formation of fines under mechanical stress on the silica and on the absorbates produced therewith. The mechanical stresses in the course of packaging and transport of the silica, in the course of production of the absorbates, and in the course of use of the laden support materials are simulated by the action of ultrasound waves on the silica suspended in water for 3 min. The ratio of $d_{50}$ without ultrasound exposure to $d_{50}$ after 3 min of ultrasound exposure gives information as to how much the $d_{50}$ has been reduced by the mechanical stress. The harder the silica, the smaller the difference between $d_{50U}$ after ultrasound exposure and $d_{50}$ without ultrasound exposure, i.e., in the ideal case, the ratio of $d_{50}$ without ultrasound exposure to dsou after 3 min of ultrasound exposure would be 1.00. The inventive granular silicas have a very good hardness in spite of their high mean particle size, such that the ratio of $d_{50U}$ without ultrasound exposure to $d_{50}$ after 3 min of ultrasound exposure is less than 3.00, preferably less than 2.60, more preferably less than 2.10 and especially preferably less than 1.60. This measurement is effected on a fraction of particles of 400 μm-500 μm.

The particle size distribution—characterized by the $d_{Q3=10\%}$ and the $d_{Q3=90\%}$—is important to ensure good flow properties in fixed bed reactors or to ensure good fluidization properties in fluidized bed reactors. Excessively large particles do not have sufficient specific surface area for the reaction, dissolution and diffusion. Excessively small particles in turn increase the flow resistance. The inventive granular silicas therefore have a $d_{Q3=10\%}$ of >400 μm and $d_{Q3=90\%}$<3000 μm.

The inventive granular silicas preferably have a pH in the range from 5 to 8.5. This substantially neutral pH of the silicas ensures a broad application spectrum with regard to the liquids to be absorbed, since excessively acidic or excessively basic support materials can trigger or accelerate the decomposition or other chemical conversion of the liquids to be absorbed.

For carrier or support applications, a number of silicas on the market can be used in the process according to the invention. Examples thereof are the silicas SIPERNAT® 50, SIPERNAT® 50S, 500LS, 22, SIPERNAT® 22S, SIPERNAT® 22 LS and SIPERNAT® 33 from Evonik Degussa GmbH. As the inventors have found, these silicas—even though developed specially for carrier or support applications—are themselves unsuitable or only insufficiently suitable for use as a support material in the field of catalytic processes. The cause of this—especially in the case of the spray-dried, nozzle tower-dried and/or ground particles—is the excessively low particle size thereof, which, as outlined above, can lead to an undesired pressure rise in the reactor. By virtue of the process according to the invention, compaction of the silicas is undertaken, the particle size and the strength of the particles obtained thereby being controlled by the process according to the invention such that particles with an optimum particle size distribution and hardness are obtained, which have a low flow resistance in the reactor or can easily be filtered out of suspensions.

In addition to the silicas already mentioned, in step a) of the first process according to the invention, it is possible to use, for example, the silicas SIPERNAT® 2200, Aerosil® 200 from Evonik Degussa GmbH, Tixosil® 38 A to X from Rhodia Chimie, HiSil® SC 60 and HiSil® SC 72 from PPG, Hubersil® 5170 from Huber, and the silicas disclosed in European Patents EP 0984772 B1, EP 0966207 B1 and EP 0937755 A1.

The silicas used in the process according to the invention have
- a mean particle size $d_{50}$ without ultrasound treatment of 0.1 to 350 μm, preferably of 0.1 to 200 μm, more preferably of 0.1 to 150 μm and most preferably of 1 to 50 μm;
- a BET surface area of 30 to 800 m²/g, preferably of 40 to 700 m²/g, more preferably of 50 to 600 m²/g, most preferably of 150 to 550 m²/g;
- a DBP number of 140 to 400 g/(100 g), preferably of 140 to 350 g/(100 g), more preferably of 190 to 350 g/(100 g), most preferably of 290 to 350 g/(100 g).

The first process according to the invention is preferably performed in a mixer, kneader or compactor (optionally with downstream extruder) and downstream dryer, screen granulator and screen. For example, it is possible first to wet the initially charged silica with liquid, for example in an apparatus from Eirich GmbH (unless filtercake is used directly), then to compress or compact it, then extrude it and dry it. It is likewise possible to dry the liquid-wetted and compressed or compacted silica, then to perform a screen granulation and then to screen it to the desired particle fraction.

The hardness of the final carrier or support particles can be controlled by the measure of compression or compaction of the starting silica. The compaction is generally effected by the addition of water with simultaneous introduction of shear energy. In addition, it is also possible to add aqueous solutions such as cellulose solutions or oils, which are suitable for functioning as binders between the particles. The liquid is, based on a density of 1.00 g/ml, added preferably in proportions of 50 to 90% by weight, more preferably in proportions of 60 to 90% by weight and most preferably in proportions of 65 to 90% by weight. In addition, during the compaction, it is possible to add a solid which is suitable for functioning as a binder between the particles, for example cellulose, waxes or polymers, or monomers which are subsequently polymerized. The solid is added in proportions of 0.1 to 50% by weight, preferably in proportions of 0.5 to 15% by weight, more preferably in proportions between 0.5 and 8% by weight.

In a preferred embodiment, the carrier or support materials are compressed or compacted without the addition of binders.

The compaction is performed preferably at a temperature of 10° C. to 90° C., more preferably of 10° C. to 70° C.

The shaping in the first process according to the invention is preferably effected by intensively compacting the starting silica in the mixing unit with the aid of the liquid added until there is partial discharge of liquid, and granulation of the particles sets in. The particle size of the granules thus obtained (raw granules) can be homogenized by an extrusion step, and they can then be dried. In addition, the moist raw granules, on omission of the extrusion step, can also be dried directly and, for example, passed through a screen having a characteristic size of 3000 μm, which comminutes the particles larger than the characteristic screen size. The passage is effected preferably in apparatuses such as a screen mill from Frewitt or Hosokawa Bepex GmbH. Particles larger than the characteristic size of the passage screen can, in the case of use of the inventive support materials in the field of suspension catalysis, lead to the undesired sedimentation of the absorbates and result in long diffusion or reaction times. It is additionally advantageous when all screen fractions smaller than 400 μm are removed. As described above, these small particles have an adverse effect on the flow resistance of the particles and lead to pressure drops in fixed bed reactors.

The screening can be effected by means of all known techniques, preferably by means of a vibrating screen from companies like Vibra, Engelsmann or Allgeier. It is possible to perform several screens or several screening steps.

In the second case of the process according to the invention, in which the compaction of the silica is preferably performed in a dry compactor with downstream screen granulator and screen, in other words, the initially charged silica is first, for example, compacted in an apparatus from Hosokawa Bepex GmbH, such as Bepex L200/50, or from Alexanderwerk AG, and then the compacted material is fractionated to the desired particle fraction.

In step ii) of the second process according to the invention, the dry starting silica is compacted, i.e. pressed to slugs, which have a particle size and hardness optimized for the inventive application. The hardness can be controlled by the pressure with which the starting silicas are compacted. The compaction is effected preferably at a specific contact pressure of 0.5 to 15 kN/cm of roller width, more preferably of 3 to 12 kN/cm of roller width and most preferably of 6 to 10 kN/cm of roller width, and at a temperature of 10° C. to 90° C., more preferably of 10° C. to 70° C. In addition, during the compaction, it is possible to add a liquid, preferably water, aqueous solutions such as cellulose solutions, or oils, which are suitable for functioning as a binder between the particles. The liquid is preferably added in proportions of 1 to 30% by weight, more preferably in proportions of 1 to 20% by weight and most preferably in proportions of 3 to 15% by weight. In addition, during the compaction, it is possible to add a solid which is suitable for functioning as a binder between the particles, for example cellulose, waxes or polymers or monomers, which are subsequently polymerized. The solid is added in proportions of 0.1 to 50% by weight, preferably in proportions of 0.5 to 15% by weight, more preferably in proportions between 0.5 and 8% by weight.

This dry compaction is preferably effected in such a way that the dry starting silica is pressed in a compaction unit between two rotating rollers, at least one roller more preferably having recesses such as grooves, depressions or cushions, the characteristic dimensions of which are greater than those of the particles to be obtained. The rollers are of straight or concave configuration. A further particularly preferred embodiment consists in using at least one perforated toothed wheel roller. In addition, it may be advantageous when at least one roller is configured such that a reduced pressure can be generated at the roller surface, by which the silica to be compacted is sucked onto the roller. The silica can be supplied to the compaction unit by means of all conveying means known to those skilled in the art, for example conveying screws, twin screws, etc.

After the compaction, the slugs obtained are passed through a screen having a characteristic size of 3000 μm, in the course of which the particles larger than the characteristic screen size are comminuted. The passage is effected preferably in apparatus such as a screen mill from Frewitt or Hosokawa Bepex GmbH. The particles larger than the characteristic size of the passage screen, when used in inventive support materials in the field of suspension catalysis, can lead to undesired sedimentation of the absorbates and result in long diffusion or reaction times. In addition, the screen fraction smaller than 400 μm is removed. As described above, these small particles have an adverse effect on the flow resistance of a particle bed, and lead to pressure drops in fixed bed reactors.

The possible water vapour treatment on the finished dry granules can be accomplished in all apparatuses suitable for this purpose, examples being belt dryers, rotary tube dryers, drying cabinets, fluidized bed dryers, etc. The granules are exposed to a temperature of 70° C.-400° C., preferably 80° C.-300° C., more preferably 90° C.-200° C. and most preferably 106° C.-180° C. The residence time at this temperature is up to 16 h, preferably up to 12 h, more preferably up to 8 h, most preferably up to 4 h.

The possible calcination of the particles can be effected in different apparatus, for example calcining furnaces, belt or rotary tube calciners, or in flash or fluidized bed calciners. This involves exposing the granules to temperatures of 700° C.-1200° C., preferably 800° C.-1200° C., more preferably 800° C.-1100° C. The residence time depends on the calcination temperature and the desired particle hardness. The residence time in the process is 1 h, preferably 20 min, more preferably less than 10 min.

The inventive granular silicas can be used to produce absorbates, the absorbed substances preferably being hardening agents or initiators, crosslinking agents, catalysts, active pharmaceutical ingredients and excipients, active cosmetic ingredients and excipients, cleansing and/or care compositions, flavourings, aromas and fragrances, animal feeds or animal feed additives, for example amino acids, vitamins, minerals, foods or food additives, dyes and/or pigments, amino acids, oxidizing or bleaching agents, additives with microbicidal, especially fungicidal or bactericidal, action, chemicals for agriculture and forestry, and/or a concrete admixture. The material absorbed on the carrier may be an aqueous or nonaqueous liquid, for example an oil, a resin, a solution, a dispersion, a suspension, an emulsion, a wax, a polymer or a melt. The absorbed substances can subsequently be treated thermally, heat treated, or induced to crystallize, to solidify, to separate or to react. In addition, the absorbed substances can be dried beforehand or afterwards.

Absorbates in the sector of animal feeds and animal feed additives include, for example, vitamins, minerals, carboxylic acids, mineral acids, amino acids, fats, oils and aromas. These are more preferably formic acid, acetic acid, propionic acid, lactic acid, phosphoric acid, choline chloride solution, vitamin E acetate and plant extracts, for example tagetes extract.

Absorbates in the sector of agriculture and forestry include, for example, absorbed fertilizers, for example nitrate- and/or phosphate-containing fertilizers, crop protection compositions, pesticides, for example herbicides, fungicides, insecticides.

Absorbates in the sector of cosmetic products include, for example, oils such as essential oils, perfume oils, care oils, fragrance oils and silicone oils, active antibacterial, antiviral or fungicidal ingredients; disinfectant and antimicrobial substances; deodorants; antioxidants; biologically active substances and biogenic active ingredients; vitamins and vitamin complexes; enzymes and enzymatic systems such as amylases, cellulases, lipases and proteases; cosmetically active substances such as ingredients of cosmetics and personal hygiene products; washing- and cleaning-active substances such as surfactants of all kinds, washing- and/or cleaning-active inorganic and organic acids, soil-repellent and soil-release active ingredients, oxidants and bleaches, bleach activators, builders and cobuilders, antiredeposition additives, greying and discolouration inhibitors, active substances for colour protection, substances and additives for laundry care, optical brighteners, foam inhibitors, pH modifiers and pH buffer substances.

Absorbates in the sector of foods and food additives include, for example, absorbed aromas, food supplements, vitamins, minerals, amino acids.

Absorbates from active pharmaceutical ingredients include all kinds of active pharmaceutical ingredients, for example α-proteinase inhibitor, abacavir, abciximab, acarbose, acetylsalicylic acid, acyclovir, adenosine, albuterol, aldesleukin, alendronate, alfuzosin, alosetron, alprazolam, alteplase, ambroxol, amifostine, amiodarone, amisulpride, amlodipine, amoxycillin, amphetamine, amphotericin, ampicillin, amprenavir, anagrelide, anastrozole, ancrod, antihaemophilic factor, aprotinin, atenolol, atorvastatin, atropine, azelastine, azithromycin, azulene, barnidipine, beclomethasone, benazepril, benserazide, beraprost, betamethasone, betaxolol, bezafibrate, bicalutamide, bisabolol, bisoprolol, botulin toxin, brimonidine, bromazepam, bromocriptine, budesonide, bupivacaine, bupropion, buspirone, butorphanol, cabergoline, calcipotriene, calcitonin, calcitriol, camphor, candesartan, candesartan cilexetil, captopril, carbamazepine, carbidopa, carboplatin, carvedilol, cefaclor, cefadroxil, cefaxitin, cefzolin, cefdinir, cefepime, cefixime, cefmetazole, cefoperazone, cefotiam, cefoxopran, cefpodoxime, cefprozil, ceftazidime, ceftibuten, ceftriaxone, cefuroxime, celecoxib, celiprolol, cephalexin, cerivastatin, cetirizine, chloramphenicol, cilastatin, cilazapril, cimetidine, ciprofibrate, ciprofloxacin, cisapride, cisplatin, citalopram, clarithromycin, clavulanic acid, clindamycin, clomipramine, clonazepam, clonidine, clopidogrel, clotrimazole, clozapine, cromolyn, cyclophosphamide, cyclosporin, cyproterone, dalteparin, deferoxamine, desogestrel, dextroamphetamine, diazepam, diclofenac, didanosine, digitoxin, digoxin, dihydroergotamine, diltiazem, diphtheria protein, diphtheria toxoid, divalproex, dobutamine, docetaxel, dolasetron, donepezil, dornase-α, dorzolamide, doxazosin, doxifluridine, doxorubicin, dydrogesterone, ecabet, efavirenz, enalapril, enoxaparin, eperisone, epinastine, epirubicin, eptifibatide, erythropoietin-α, erythropoietin-β, etanercept, ethynyloestradiol, etodolac, etoposide, factor famciclovir, famotidine, faropenem, felodipine, fenofibrate, fenoldopam, fentanyl, fexofenadine, filgrastim, finasteride, flomoxef, fluconazole, fludarabine, flunisolide, flunitrazepam, fluoxetine, flutamide, fluticasone, fluvastatin, fluvoxamine, follitropin-α, follitropin-β, formoterol, fosinopril, furosemide, gabapentin, gadodiamide, ganciclovir, gatifloxacin, gemcitabine, gestodene, glatiramer, glibenclamide, glimepiride, glipizide, glyburide, goserelin, granisetron, griseofulvin, hepatitis B antigen, hyaluronic acid, hycosin, hydrochlorothiazide, hydrocodone, hydrocortisone, hydromorphone, hydroxychloroquine, hylan G-F 20, ibuprofen, ifosfamide, imidapril, imiglucerase, imipenem, immunoglobulin, indinavir, indomethacin, infliximab, insulin, insulin human, insulin lispro, insulin aspart, interferon-β, interferon-α, iodine-125, iodixanol, iohexol, iomeprol, iopromide, ioversol, ioxoprolene, ipratropium, ipriflavone, irbesartan, irinotecan, isosorbide, isotretinoin, isradipine, itraconazole, potassium chlorazepate, potassium chloride, ketorolac, ketotifen, whooping cough vaccine, clotting factor IX, lamivudine, lamotrigine, lansoprazole, latanoprost, leflunomide, lenograstim, letrozole, leuprolide, levodopa, levofloxacin, levonorgestrel, levothyroxine, lidocaine, linezolide, lisinopril, lopamidol, loracarbef, loratadine, lorazepam, losartan, lovastatin, lysine acetylsalicylic acid, manidipine, mecobalamin, medroxyprogesterone, megestrol, meloxicam, menatetrenone, meningococcus vaccine, menotropin, meropenem, mesalamine, metaxalone, metformin, methylphenidate, methylprednisolone, metoprolol, midazolam, milrinone, minocycline, mirtazapine, misoprostol, mitoxantrone, moclobemide, modafinil, mometasone, montelukast, morniflumate, morphium, moxifloxacin, mycophenolate, nabumetone, nadroparin, naproxen, naratriptan, nefazodone, nelfinavir, nevirapine, niacin, nicardipine, nicergoline, nifedipine, nilutamide, nilvadipine, nimodipine, nitroglycerin, nizatidine, norethindrone, norfloxacin, octreotide, olanzapine, omeprazole, ondansetron, orlistat, oseltamivir, oestradiol, oestrogens, oxaliplatin, oxaprozin, oxolinic acid, oxybutynin, paclitaxel, palivizumab, pamidronate, pancrelipase, panipenem, pantoprazole, paracetamol, paroxetine, pentoxifylline, pergolide, phenytoin, pioglitazone, piperacillin, piroxicam, pramipexole, pravastatin, prazosin, probucol, progesterone, propafenone, propofol, propoxyphene, prostaglandin, quetiapin, quinapril, rabeprazole, raloxifene, ramipril, ranitidine, repaglinide, reserpine, ribavirin, riluzole, risperidone, ritonavir, rituximab, rivastigmin, rizatriptan, rofecoxib, ropinirole, rosiglitazone, salmeterol, saquinavir, sargramostim, serrapeptase, sertraline, sevelamer, sibutramine, sildenafil, simvastatin, somatropin, sotalol, spironolactone, stavudine, sulbactam, sulfaethidole, sulfamethoxazole, sulfasalazine, sulpiride, sumatriptan, tacrolimus, tamoxifen, tamsulosin, tazobactam, teicoplanin, temocapril, temozolomide, tenecteplase, tenoxicam, teprenone, terazosin, terbinafine, terbutaline, tetanus toxoid, tetrabenazine, tetrazapam, thymol, tiagabine, tibolone, ticarcillin, ticlopidine, timolol, tirofiban, tizanidine, tobramycin, tocopheryl nicotinate, tolterodin, topiramate, topotecan, torasemide, tramadol, trandolapril, trastuzumab, triamcinolone, triazolam, trimebutine, trimethoprim, troglitazone, tropisetron, tulobuterol, unoprostone, urofollitropin, valacyclovir, valproic acid, valsartan, vancomycin, venlafaxine, verapamil, verteporfin, vigabatrin, vinorelbine, vinpocetine, voglibose, warfarin, zafirlukast, zaleplon, zanamivir, zidovudine, zolmitriptan, zolpidem, zopiclone and derivatives thereof. However, active pharmaceutical ingredients are also understood to mean other substances such as vitamins, provitamins, essential fatty acids, extracts of vegetable and animal origin, oils of vegetable and animal origin, vegetable medicament preparations and homeopathic preparations.

The inventive granular silicas can especially be used as a carrier for animal feed additives, for example formic acid, propionic acid, lactic acid, phosphoric acid, choline chloride solution, vitamin E acetate or plant extracts, for example tagetes extract.

In addition, the inventive granular silicas can be used as a carrier material for chemical products such as melamine resins, rubber additives, plastics additives, additives for construction chemicals or paint additives.

The inventive granular silicas are most preferably used as support material for catalysts of all kinds. The catalysts may especially preferably be enzymes or a combination of different enzymes, for example enzymes from the class of the oxidoreductases, transferases, hydrolases, lipases, lysases, isomerases and ligases (according to EC (Enzyme Commission) number of the Nomenclature Committee of the International Union of Biochemistry and Molecular Biology). Enzyme variants which have been produced, for example, by recombination techniques shall likewise be included in the term "enzyme".

To produce the laden carriers or supports, the inventive granular silicas are contacted with at least one substance to be absorbed, such that the substance can penetrate into the pores of the silica. For this purpose, it is possible to employ all technologies known to those skilled in the art, for example spray application, dropwise application, saturation, impregnation, nozzle spraying, etc. The silica is preferably initially charged in a solids mixing unit, for example kneader, paddle dryer, tumbling mixer, vertical mixer, paddle mixer, Schugi mixer, cement mixer, Gericke continuous mixer, Eirich mixer and/or silo mixer. The temperature in the mixing unit is, as a function of the nature and composition of the substance to be absorbed, preferably between 5 and 90° C., more preferably between 10 and 70° C. The pressure in the mixer is preferably between 0.1 bar and 2 bar, more preferably between 0.5 bar and 1.2 bar.

The content of absorbed substance in the laden carriers or supports is between 5 and 70%, preferably between 5 and 65%, more preferably between 5 and 60%. The term "absorbed substance" describes the sum of all substances applied to the carrier or support.

The inventive absorbates are especially preferably used as catalysts in fixed bed reactors, in the field of heterogeneous catalysis, in fluidized bed reactors and for reaction in suspensions.

The physicochemical data of the raw materials used and of the inventive granular silicas are determined by the following methods:

Determination of BET Surface Area

The specific nitrogen surface area (referred to hereinafter as BET surface area) of silica is determined to ISO 9277 as the multipoint surface area. The measuring instrument used is the TriStar 3000 surface area measuring instrument from Micromeritics. The BET surface area is typically determined within a partial pressure range of 0.05-0.20 of the saturation vapour pressure of liquid nitrogen. The sample is prepared by heating the sample at 160° C. under vacuum for one hour in the VacPrep 061 heating station from Micromeritics.

Determination of DBP Absorption

DBP absorption (DBP number), which is a measure of the absorptivity of the silica, is determined on the basis of the standard DIN 53601 as follows.

12.50 g of silica with moisture content 3-10% (if necessary, the moisture content is adjusted by drying at 105° C. in a drying cabinet) are introduced into the kneading chamber of the C absorptometer from Brabender. The measurement on the C absorptometer is effected with PC support using the software BRABENDER Automatic Oil Absorption System Version 1.1.2 with fixed damping of the measured torque curve.

In the case of filtercakes, they are dried before use down to a moisture content of ≤10% at 105° C. in a drying cabinet, and passed through a 3 mm screen and then through a 300 μm screen.

At a peripheral speed of the left-hand kneader paddle of 125 rpm, the Titronic Universal burette (from Schott) which forms part of the C absorptometer is used to add dibutyl phthalate dropwise to the kneading chamber at room temperature at a rate of 4 ml/min. The switch-off point at which the control software of the C absorptometer stops the kneader and DBP metering is defined at a torque of 0.6 Nm.

The following formula serves to calculate the DBP absorption [g/100 g]:

$$DBP = \frac{V*D*100}{E} * \frac{g}{100\ g} + K$$

where
DBP: DBP absorption [g/100 g]
V: DBP consumed [ml]
D: DBP density [g/ml] (1.047 g/ml at 20° C.)
E: Starting weight of silica [g]
K: Correction value according to moisture correction table [g/100 g]

The DBP absorption is defined for anhydrous dried silicas. In the case of use of undried silicas, the correction value K should be taken into account for the calculation of the DBP absorption. This value can be determined using the correction table below.

TABLE 1

Moisture correction table for dibutyl phthalate absorption (anhydrous)

| % Moisture | .0 | .2 | .4 | .6 | .8 |
|---|---|---|---|---|---|
| 0 | 0 | 2 | 4 | 5 | 7 |
| 1 | 9 | 10 | 12 | 13 | 15 |
| 2 | 16 | 18 | 19 | 20 | 22 |
| 3 | 23 | 24 | 26 | 27 | 28 |
| 4 | 28 | 29 | 29 | 30 | 31 |
| 5 | 31 | 32 | 32 | 33 | 33 |
| 6 | 34 | 34 | 35 | 35 | 36 |
| 7 | 36 | 37 | 38 | 38 | 39 |
| 8 | 39 | 40 | 40 | 41 | 41 |
| 9 | 42 | 43 | 43 | 44 | 44 |
| 10 | 45 | 45 | 46 | 46 | 47 |

EXAMPLE

If the moisture content of a silica is 5.8%, a correction value K of 33 g/100 g is added to the value analysed as described above for the DBP absorption. The moisture content of a silica is determined by the "determination of moisture content" method described later in the text.

Determination of Particle Size by Means of Laser Diffraction

The application of laser diffraction to determine particle size distributions of pulverulent solids is based on the phenomenon that particles scatter or diffract the light from a monochromatic laser beam in all directions with different intensity patterns according to their size. The smaller the diameter of the particle being irradiated, the larger the scattering or diffraction angles of the monochromatic laser beam.

Sample Preparation for Particle Size Measurement by Means of Laser Diffraction

Since the size of the sample particles partly exceeds the measurement range of the instrument used and the ratio of d50 without ultrasound exposure to d50U after 3 min of ultrasound exposure depends on the starting particle size (smaller particles of a material possess a higher ratio of the sizes described), the measurement is preceded by screening a particle fraction of 400 μm-500 μm out of the sample. This operation allows the stability of different materials to be compared reliably to obtain a statement about the substance-specific stability. The screening is effected with a HAVER EML 200 Digital Plus screening machine, from Haver & Boecker, 59302 Oelde, which is equipped with 400 μm and 500 μm screens. 5 g of the starting material are applied to the upper, 500 μm screen, and screened with an amplitude setting of 1.0 for 2 minutes. The particle fraction between 400 μm and 500 μm is used for the further analysis.

Should the 400 μm to 500 μm fraction, which is important for the comparison, not be part of the particle size distribution of the present carrier or support material, a corresponding screen fraction is produced by passing a sufficient amount of the starting material through a 500 μm screen at 100 oscillations/minute with the aid of a TG2S screen granulator from Eweka GmbH, Heusenstamm, and then screened off through a 400 μm screen. The screening is accomplished as described above.

$d_{50}$ Determination without Ultrasound Exposure

In the case of hydrophilic silicas, the sample is prepared for the analysis (rinsing of the module, etc.) by means of the LS 230 laser diffraction system (from Beckman Coulter; measurement range 0.04-2000 μm) and liquid module (Small Volume Module Plus, 120 ml, from Beckman Coulter with integrated ultrasound finger) with the aid of 0.05% m/m tetrasodium diphosphate in demineralized water as dispersion liquid, and in the case of insufficiently water-wettable silicas with an ethanol/water mixture (volume ratio 1:1) as dispersion liquid.

Before the start of the analysis, the laser diffraction system has to warm up for 2 hours. Thereafter, the SVM module is rinsed three times with the dispersion liquid. The following parameters relevant for the particle analysis should be set:

Analysis time: 60 seconds
Number of measurements: 1
Pump speed: 75%
Optical model: Fraunhofer
PIDS function: deactivated
Offset analysis: activated
Adjustment: Auto
Background measurement: activated
Set sample concentration: activated A spatula is used to add the silica screen fraction (400-500 μm) until the required measurement concentration for which the LS 230 laser diffractor gives the "OK" message is attained. After dispersing the silica suspension for 60 seconds by pumped circulation without ultrasound exposure, the analysis is effected at room temperature. From the raw data curve, the software calculates the particle size distribution and the $d_{50}$ without ultrasound exposure (median) on the basis of the Fraunhofer model (Fraunhofer.rfd file).

$d_{50U}$ Determination after 3 Minutes of Ultrasound Treatment at 100% Amplitude The silica suspension present in the LS 230 laser diffractor is dispersed again by ultrasound treatment for 180 seconds by means of the ultrasound finger integrated in the SVM module (Vibra Cell VCX 130 ultrasound processor from Sonics with CV 181 ultrasound converter and 6 mm ultrasound tip) at 100% amplitude with simultaneous pumped circulation in the liquid module, and analysed as described above.

From the raw data curve, the software calculates the particle size distribution and the $d_{50}$ after 3 minutes of ultrasound exposure (medium) on the basis of the Fraunhofer model (Fraunhofer.rfd file).

Determination of Particle Size by Means of Dynamic Image Evaluation

In dynamic image evaluation, a stream of bulk material falls downwards between a light source and a camera. The particles are detected as a projection area, digitalized and converted to a particle size with a computer program.

Determination of dQ3=10% and dQ3=90%

To measure the particle size, the CAMSIZER from RETSCH Technology GmbH, Haan is used. The particles are supplied to the measuring instrument with the aid of the DR 100-40 metering channel with reservoir funnel. For the image evaluation, the software supplied in version 3.12d should be used.

Figure 1:
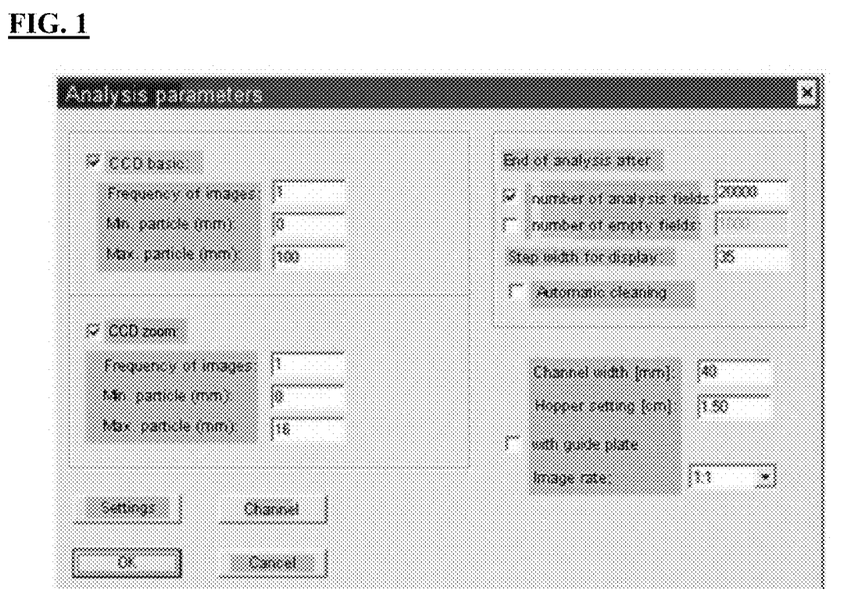
FIG. 1 shows an example of parameters, recorded in an analysis tasks file (*.afg), for an analysis of particle size according to the present invention.

Before the start of the analysis, the instrument is allowed to warm up for 2 h. It is ensured that glass guards in front of the illumination unit and the camera are free of dust. The distance between funnel and metering channel is adjusted to about three times the maximum particle size. The metering channel is placed directly above the measuring instrument. About 150 ml of sample are introduced into the funnel. The following parameters for the analysis are recorded in the analysis tasks file (*.afg), as shown in FIG. 1.

Figure 2:
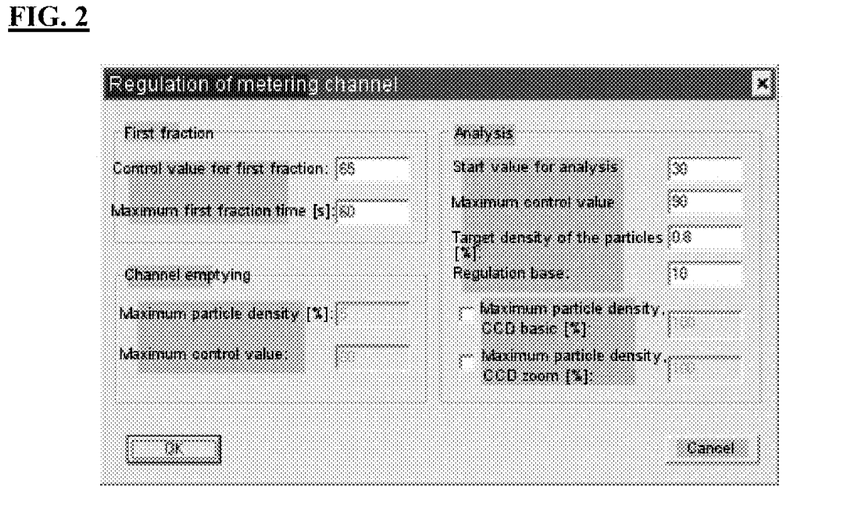
FIG. 2 shows an example of settings for regulating a metering channel according to the present invention.

To regulate the metering channel, the following settings are recorded in the software, as shown in FIG. 2.

Figure 3:
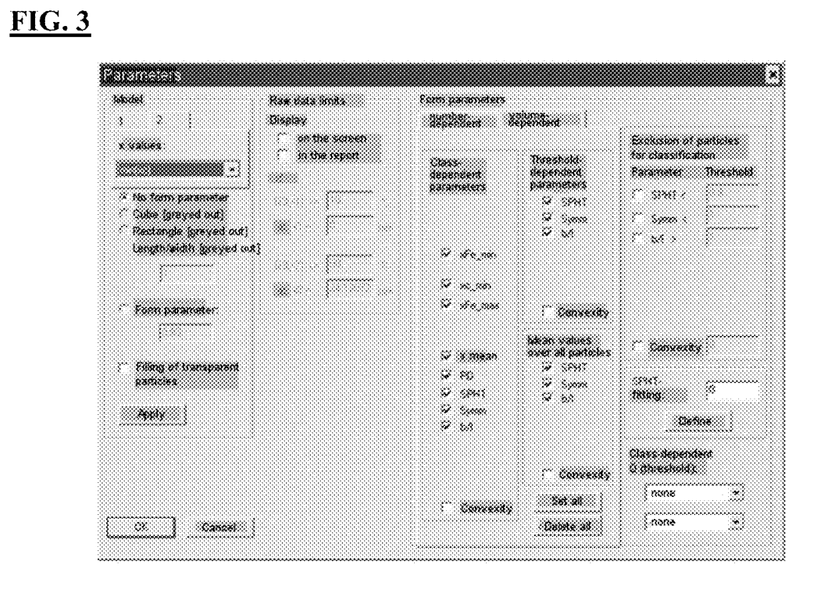
FIG. 3 shows an example of x values calculated from min(xc) values, without form factors, for use in evaluating digitized images according to the present invention.

In the evaluation of the digitalized images, the x values are calculated from the min(xc) values. No form factors are used, as shown in FIG. 3.

Figure 4:
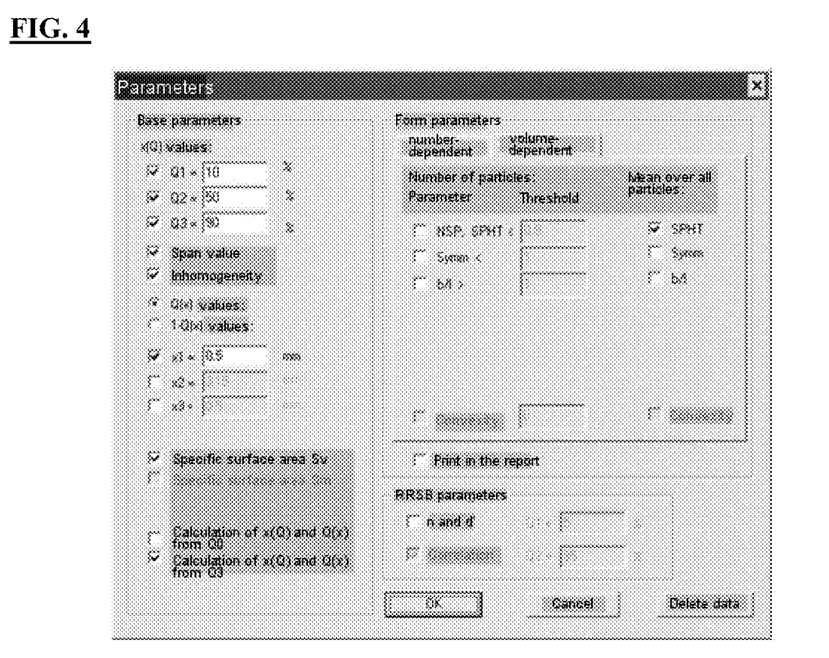
FIG. 4 shows an example of $d_{Q3=10\%}$ and $d_{Q3=90\%}$ outputs, as determined from the base parameters, according to the present invention.

The output of the $d_{Q3=10\%}$ and of the $d_{Q3=90\%}$ is determined in the base parameters, as shown in FIG. 4.

No fitting of analysis data is undertaken with the aid of fitting files.

Determination of Moisture Content

The moisture content of silicas is determined to ISO 787-2. For this purpose, a sample amount of 1-4 g is dried in a drying cabinet at (105±2°) C. for 2 hours and evaluated according to the ISO specifications. This drying loss consists predominantly of physically bound water.

Determination of pH of the Silica

The pH of the silica is determined as an aqueous suspension at room temperature. Granulated samples are pestled or ground beforehand. 95 g of deionized water are added to 5 g of silica. The suspension is stirred by means of a magnetic stirrer for 5 minutes. Directly thereafter, with the aid of a pH meter calibrated in the expected measurement range (Metrohm 780 pH Meter), the pH of the suspension is measured accurately to one decimal place.

Determination of Mercury Pore Volume ≤4 μm

The method is based on mercury intrusion to DIN 66133, using an AutoPore IV 9520 system from Micromeritics. The process principle is based on the measurement of the mercury volume injected into a porous solid as a function of the pressure applied. This covers only the pores into which mercury can penetrate at the pressure applied (max. 414 MPa) (Ritter and Drake method).

A non-wetting liquid penetrates into a porous system only under pressure. The pressure to be expended is inversely proportional to the clear width of the pore orifices. For cylindrical pores, the relationship between pore radius $r_p$ and pressure p is given by the Washburn equation:

$$r_p = -\frac{2 \times \sigma}{p} \times \cos\theta$$

$r_p$: Pore radius
p: Pressure
σ: Surface tension (480 mN/m*)
θ: Contact angle of mercury (140° *)
*to DIN 66133

The mercury pore volume ≤4 μm is calculated from the cumulated pore volume of all pores having a diameter of ≤4 μm down to the detection limit of the AutoPore IV 9520 mercury porosimeter (maximum pressure 414 MPa).

The examples which follow are intended to illustrate the invention in detail, without restricting the scope thereof.

Example 1

SIPERNAT®50S from Evonik Degussa GmbH was mixed and compacted in a mixer (from Somakon, MP-L1) with addition of 200 ml of water/100 g of silica. This was done using a 0.5 litre mixing vessel at a temperature of 23° C., equipped with the standard mixing cross. At a mixing rate of 2200 rpm, 30 g of water are metered into the 15 g of silica weighed in within 20 seconds, and then the mixture is mixed until granulation. The operation is stopped as soon as outwardly slightly moist 5 mm agglomerates have formed. The granules obtained are dried to constant weight at 160° C. in a drying cabinet, then passed through a 500 μm screen and screened through a 400 μm screen in a further step. The 400-500 μm screen fraction thus obtained is used for the subsequent testing of hardness and of porosity.

Example 2

SIPERNAT®50S from Evonik Degussa GmbH was mixed and compacted in a mixer (from Somakon, MP-L1) with addition of 270 ml of water/100 g of silica. This was done using a 0.5 litre mixing vessel at a temperature of 23° C., equipped with the standard mixing cross. At a mixing rate of 2200 rpm, 40.5 g of water are metered into the 15 g of silica weighed in within 20 seconds, and then the mixture is mixed until granulation. The operation is stopped as soon as outwardly slightly moist 5 mm agglomerates have formed. The granules obtained are dried to constant weight at 160° C. in a drying cabinet, then passed through a 500 μm screen and screened through a 400 μm screen in a further step. The 400-500 μm screen fraction thus obtained is used for the subsequent testing of hardness and of porosity.

Example 3

A sample of the carrier or support silica produced in example 2 is stored under a water vapour atmosphere at 110° C. for 16 h, then dried to constant weight at 120° C. and used for the subsequent testing of hardness and of porosity.

Example 4

Filtercake of a SIPERNAT® 22 (from Evonik Degussa GmbH) suspension with a solids content of approx. 25% is introduced in precomminuted form into a drum granulator (from RWK). At a fill level of 20%, a speed of 8 rpm, a batch time of 90 minutes and a heating temperature of 120° C., dry granules are formed. The granules are subsequently crushed in a screen granulator (from Frewitt, MG 633) with a 1250 μm screen insert to a defined maximum particle size. In order to obtain a dust-free product, the fines are removed by screening (from Gough, Vibrecon GV 2/1, Ø 600 mm) through a 400 μm screen. These fines can be used together with the filtercake in the next granulation batch. The granules obtained are dried to constant weight at 160° C. in a drying cabinet, then passed through a 500 μm screen and screened through a 400 μm screen in a further step. The 400-500 μm screen fraction thus obtained is used for the subsequent testing of hardness and of porosity.

Example 5

Filtercake of a SIPERNAT® 22 (from Evonik Degussa GmbH) suspension with a solids content of approx. 25% is introduced in precomminuted form into a drum granulator (from RWK). At a fill level of 20%, a speed of 8 rpm, a batch time of 90 minutes and a heating temperature of 120° C., dry granules are formed.

5.0 g of the granules thus obtained are weighed into a porcelain dish (mass: 154 g; diameter: 120 mm) and placed into a laboratory furnace preheated to 1000° C. (Nabertherm). After 5 minutes, the sample is removed and transferred immediately to a cold glass vessel. The cooled granules are subsequently passed through a 500 μm screen and screened through a 400 μm screen in a further step. The 400-500 μm screen fraction thus obtained is used for the subsequent testing of hardness and of porosity.

Example 6

SIPERNAT® 22 from Evonik Degussa GmbH is compacted with a compactor (from Bepex, L200/50) at a contact pressure of the rollers of 40 kN. The compactates are subsequently crushed to a defined maximum particle size in a screen granulator (from Frewitt, MG 633) with a screen insert of 2800 μm. In order to obtain a dust-free product, the fines from the granulation are removed by screening (from Gough, Vibrecon GV 2/1, Ø 600 mm) through a 400 μm screen, and recycled into the initial charge of the compactor. For the testing, the granules are screened through a 500 μm screen and screened through a 400 μm screen in a further step. The 400-500 μm screen fraction thus obtained is used for the subsequent testing of hardness and of porosity.

Example 7

SIPERNAT®50S from Evonik Degussa GmbH was mixed and compacted in a mixer (from Somakon, MP-L1) with addition of 233 ml of water/100 g of silica. This was done using a 0.5 litre mixing vessel at a temperature of 23° C., equipped with the standard mixing cross. At a mixing rate of 2200 rpm, 35 g of water are metered into the 15 g of silica weighed in within 20 seconds, and then the mixture is mixed until granulation. The operation is stopped as soon as outwardly slightly moist 5 mm agglomerates have formed. The granules obtained are dried to constant weight at 160° C. in a drying cabinet, then passed through a 500 μm screen and screened through a 400 μm screen in a further step. The 400-500 μm screen fraction thus obtained is used for the subsequent testing of hardness and of porosity.

The physicochemical properties of the inventive silicas according to examples 1-7 are listed in table 2 below.

COMPARATIVE EXAMPLES

Table 2 contains figures for the physicochemical properties of comparative silicas of the prior art. Comparative examples A and B correspond to Ultrasil® 7000 GR and Ultrasil® VN3 GR from Evonik Degussa GmbH. Comparative example C involves Zeosil® 165 GR® from Rhodia Chimie. Comparative example D involves Zeodent DP-9175 from Huber. The silicas of comparative examples A-C are used commercially to reinforce rubber for car tyres.

TABLE 2

| Example/<br>Comparative<br>example | Hg pore<br>volume<br><4 μm [ml/g] | Ratio of<br>d50 to d50U<br>(400-500 μm<br>fraction) | dQ3 = 10%<br>[μm] | dQ3 = 90%<br>[μm] |
| --- | --- | --- | --- | --- |
| 1 | 1.20 | 1.42 | 467 | 994 |
| 2 | 1.97 | 2.50 | 446 | 995 |
| 3 | 1.90 | 1.58 | 442 | 989 |
| 4 | 1.67 | 3.03 | 562 | 923 |
| 5 | 0.95 | 1.09 | 428 | 977 |
| 6 | 1.05 | 1.47 | 563 | 2448 |
| 7 | 1.62 | 1.34 | 444 | 964 |
| A | 1.83 | 21.34 | 439 | 6292 |
| B | 1.63 | 5.40 | 955 | 5538 |
| C | 1.60 | 16.67 | 316 | 5311 |
| D | 1.31 | 1.74 | 299 | 603 |

In table 2, examples 1 and 2 show clearly that, caused by the compaction of the starting silica, the stability of the particles, measured by the ratio of $d_{50U}$ without ultrasound exposure to $d_{50}$ after 3 min of ultrasound exposure, increases with decreasing water content in the course of moistening. At the same time, however, the absorptivity is reduced, expressed by the Hg pore volume.

The production processes described ensure that the products from examples 1-7 have only a very small fines fraction, expressed by the dQ3=10% of more than 400 μm.

In addition, example 3 shows that the aftertreatment of the inventive silicas generates a surprisingly clear gain in particle stability with virtually unchanged porosity.

Example 5 shows that the calcination can achieve particles with extremely high hardness.

The carrier or support silicas tested in comparative examples A to C have a comparatively high absorptivity but are unsuitable for applications in catalytic processes since they have too low a hardness (characterized by the ratio of $d_{50}$ to $d_{50U}$). In addition, the $d_{Q3}$=90% values are significantly greater than 3000 μm, as a result of which the diffusion pathways for reactants and products in the pore system of the silica are too long in the application as catalyst supports.

The carrier or support silica tested in comparative example D is notable for sufficient absorptivity and hardness, but has an excessively low $d_{Q3}$=10%, which leads to increased pressure drops in reactors and increases the flow resistance of the absorbates.

This demonstrates that the inventive granular silicas have a sufficiently low fines content, and thus, given simultaneously sufficient stability and porosity, differ significantly from the commercially used carrier or support silicas customary to date.

The invention claimed is:

1. Granular silica having
an Hg pore volume (<4 μm) of 0.90 ml/g to 1.30 ml/g, a $d_{Q3=10\%}$ of ≥428 μm with, at the same time, a $d_{Q3=90\%}$ of 923 μm to 2448 μm, and
a ratio of the $d_{50}$ without ultrasound exposure to $d_{50}$ after 3 min of ultrasound exposure of 2.10 to <4.00, the measurement being effected on a fraction of particles from 400 to 500 μm.

2. Granular silica according to claim 1,
wherein the granular silica has a pH in the range from 5 to 8.5.

3. Granular silica according to claim 2,
wherein the granular silica is a precipitated silica.

4. Granular silica according to claim 1,
wherein the granular silica has a ratio of the $d_{50}$ without ultrasound exposure to $d_{50}$ after 3 min of ultrasound exposure off 2.10 to 3.00 with the measurement effected on a fraction of particles from 400 to 500 μm.

5. Granular silica according to claim 1,
wherein the granular silica has a ratio of the $d_{50}$ without ultrasound exposure to $d_{50}$ after 3 min of ultrasound exposure of 2.50 to ≤4.00 with the measurement effected on a fraction of particles from 400 to 500 μm.

6. Granular silica according to claim 1,
wherein the granular silica has a $d_{Q3=10\%}$ of 428 μm to 563 μm.

7. Granular silica according to claim 1,
wherein the granular silica has a $d_{Q3=90\%}$, of 923 μm to 995 μm.

8. Granular silica according to claim 1,
wherein the granular silica has an Hg pore volume (<4 μm) of 0.90 ml/g to 1.20 ml/g.

9. Granular silica according to claim 1,
wherein the granular silica has a ratio of the $d_{50}$ without ultrasound exposure to $d_{50}$ after 3 min of ultrasound exposure of 2.50 to 3.00 with the measurement effected on a fraction of particles from 400 to 500 μm.

10. Granular silica according to claim 1,
wherein the granular silica has a ratio of the $d_{50}$ without ultrasound exposure to $d_{50}$ after 3 min of ultrasound exposure of 2.60 to <4.00 with the measurement effected on a fraction of particles from 400 to 500 μm.

11. Granular silica according to claim 1,
wherein the granular silica has a ratio of the $d_{50}$ without ultrasound exposure to $d_{50}$ after 3 min of ultrasound exposure of 2.60 to 3.00 with the measurement effected on a fraction of particles from 400 to 500 μm.

12. Granular silica having
an Hg pore volume (<4 μm) of 0.90 ml/g to 1.90 ml/g, a $d_{Q3=10\%}$ of 428 μm to 563 μm with, at the same time, a $d_{Q3=90\%}$ of 923 μm to 995 μm, and
a ratio of the $d_{50}$ without ultrasound exposure to $d_{50}$ after 3 min of ultrasound exposure of 2.50 to <4.00, the measurement being effected on a fraction of particles from 400 to 500 μm.

13. Granular silica according to claim 12,
wherein the granular silica has an Hg pore volume (<4 μm) of 1.05 ml/g to 1.20 ml/g.

14. Granular silica according to claim 12,
wherein the granular silica has a $d_{Q3=10\%}$ of 428 μm to 467 μm.

15. Granular silica according to claim 12,
wherein the granular silica has a ratio of the $d_{50}$ without ultrasound exposure to $d_{50}$ after 3 min of ultrasound exposure of 2.60 to <4.00 with the measurement effected on a fraction of particles from 400 to 500 μm.

16. A method for producing an absorbate comprising combining the granular silicas according to claim 1 with an additional absorbate material.

17. An absorbate comprising at least one of the granular silicas according to claim 1.

18. An absorbate according to claim 17,
wherein the absorbate comprise at least one catalytically active substance or active substance mixture.

19. Absorbate according to claim 18,
wherein the active substance or active substance mixture is applied in proportions of 1 to 20% by weight.

20. Absorbate according to claim 17,
wherein the absorbed substances are applied in proportions of 1 to 70% by weight.

21. A catalytic process comprising utilizing the absorbate according to claim 17 in the catalytic process.

22. Process according to claim 21,
wherein the process is performed in a fixed bed reactor, a fluidized bed reactor, or by suspending the absorbate in a reaction mixture.

23. Process according to claim 21,
wherein the absorbate comprises an enzyme as a catalyst on a granular silica, of the at least one granular silicas.

* * * * *